United States Patent [19]

Pretsch, Jr.

[11] Patent Number: 5,894,673
[45] Date of Patent: Apr. 20, 1999

[54] VEHICLE MOUNTED BACKING DISTANCE GAUGE

[76] Inventor: Donald C. Pretsch, Jr., 5237 Clifton St., Alexandria, Va. 22312

[21] Appl. No.: 08/908,070

[22] Filed: Aug. 11, 1997

Related U.S. Application Data

[63] Continuation-in-part of application No. 08/417,245, Apr. 5, 1995, Pat. No. 5,655,306.

[51] Int. Cl.$^6$ .................................................. G01B 5/14
[52] U.S. Cl. ............................. 33/286; 33/645; 116/28 R
[58] Field of Search ........................... 33/264, 286, 533, 33/600, 645, 700, 706, 783, 792, 802, 832, 833; 116/28 A, 28 R, 35 R, 203, 284, 285, 294, 295

[56] References Cited

U.S. PATENT DOCUMENTS

| | | | |
|---|---|---|---|
| 855,865 | 6/1907 | Roost | 33/802 |
| 986,296 | 3/1911 | Kavanagh et al. | 116/285 |
| 1,418,034 | 5/1922 | Tennett | 33/264 |
| 1,726,129 | 8/1929 | Steinle | 33/802 |
| 2,035,880 | 3/1936 | Goodale | 33/264 |
| 2,134,299 | 10/1938 | Cosner | 116/285 |
| 2,214,161 | 9/1940 | Cater | 33/264 |
| 2,731,934 | 1/1956 | Hausmann et al. | 116/28 R |
| 3,037,187 | 5/1962 | Blakistone | 116/28 R |
| 3,187,710 | 6/1965 | Wilfert | 116/28 R |
| 3,219,972 | 11/1965 | Williams | 116/28 R |
| 3,232,265 | 2/1966 | Hurt | 116/28 R |
| 3,261,321 | 7/1966 | Mandl | 116/28 R |
| 3,603,279 | 9/1971 | Hooks | 116/28 R |
| 3,621,807 | 11/1971 | Kang | 116/28 A |
| 3,624,913 | 12/1971 | Ciampolini | 33/501 |
| 4,036,165 | 7/1977 | Wood | 116/28 R |
| 4,070,645 | 1/1978 | Oreluk | 340/436 |
| 4,101,868 | 7/1978 | Bubnich et al. | 116/28 R |
| 4,257,706 | 3/1981 | Smith | 33/264 |
| 4,621,432 | 11/1986 | Law | 33/264 |
| 4,967,180 | 10/1990 | Wang | 116/28 A |
| 5,035,441 | 7/1991 | Murray | 33/286 |
| 5,189,802 | 3/1993 | Bergfield | 33/286 |
| 5,655,306 | 8/1997 | Pretsch, Jr. | 33/286 |

*Primary Examiner*—G. Bradley Bennett
*Attorney, Agent, or Firm*—Kerkam, Stowell, Kondracki & Clarke, P.C.; John C. Kerins

[57] ABSTRACT

A vehicle mounted backing distance gauge is provided, in which an activator bar carried by two side arms, normally biased to an extended position, extends approximately ten inches behind the vehicle, and as the vehicle is backed toward an object such as a loading dock, the activator bar comes into contact with the object and retracts toward a front end of the vehicle. The activator bar is coupled to a plunger beam carried within a casing mounted on the vehicle that moves in concert with the activator bar, and through the use of a bevel gear pair and a follower arm controllably moved by the forward end of the plunger beam, an indicator sign is rotated or pivoted by a shaft coupled to one of the bevel gears from a first position parallel to the side of the vehicle and extending toward the rear of the vehicle, to a diametrically opposed position parallel to the vehicle, but extending toward the front of the vehicle. The movement of the indicator sign is monitored by the driver, and the last increment of approach is highly visibly represented as a bright or high contrast flange face carried by the sign begins to, and ultimately does, disappear behind a wall of a sign housing protruding from the side of the vehicle.

7 Claims, 10 Drawing Sheets

VEHICLE MOUNTED BACKING DISTANCE GAUGE

RELATED APPLICATION

This application is a continuation-in-part of application Ser. No. 08/417,245 filed Apr. 5, 1995, now U.S. Pat. No. 5,655,306.

BACKGROUND OF THE INVENTION

1. Field of the Invention

The present invention relates to a device to aid drivers of vehicles, truck drivers in particular, in backing the vehicle to a desired spacing from another object.

2. Description of Related Art

Vehicle drivers, particularly drivers of tractortrailer vehicles or other trucks, are frequently required to back the vehicle into a parking space or loading dock. In the case of a loading dock, the trailer or truck must be backed into substantial contact, or into a very close spacing, with the loading dock, so that freight can be loaded and/or unloaded from the vehicle. This docking requirement, in the past, has led to numerous instances in which the wall of the loading dock, and/or the trailer, are damaged by the truck making contact at a slightly elevated speed, because the driver is unaware, until making contact, of the distance between the truck and the dock. Resilient dock bumpers tend to decrease this problem, but still provide little or no indication to the driver that the truck is nearing contact with the dock, as the bumpers readily compress and no impact is felt. The bumpers also do not provide a distance indication.

Devices have heretofore been proposed in the art for use in assisting the driver of a vehicle in backing the vehicle toward another object. One of these, disclosed in U.S. Pat. No. 1,418,034, issued to Tennent, provides an indicator to alert the driver of the distance between the body of the vehicle and an object to the rear of the vehicle. That device has significant disadvantages that would essentially prevent its use on modern-day cars and trucks. The Tennent device relies on the use of a retractable or compressible bumper in gauging the distance, and, with the current laws mandating the use of impact-resistant bumpers, a bumper that is designed to retract or compress at very low speeds is likely to be illegal. Further, a disadvantage of that design is that it relies on a cable system linking the bumper to the indicator in the passenger compartment of the vehicle, which, while possibly acceptable for cars, would not be acceptable for vehicles such as tractor-trailers, in which the tractor is separable from the trailer, and in many instances is used with numerous trailers.

Having an indicator in the passenger compartment, as shown in Tennent, is not as advantageous as it might first appear to be. In backing up a vehicle, the driver is generally looking outside the vehicle, either into the rearview mirror, or, more commonly, into the side view mirrors. This is particularly true of a driver backing a tractor trailer into, for example, a bay at a loading dock, in picking up or delivering the freight or cargo carried inside the trailer. The same is true of an automobile driver backing into a parking space between two other cars. If it were necessary to look in the passenger compartment to determine the current spacing between the rear of the vehicle and an approaching object, the driver would have to take his or her eyes off the mirrors, thus increasing the chances of inaccurately aligning the vehicle at the loading dock or in the parking space.

Other warning-type devices have been disclosed in the art, but generally do not provide any continuing indication of the decreasing distance between the vehicle and the object it is approaching. Examples of such devices can be found in U.S. Pat. Nos. 3,187,710 and 4,967,180. A sighting device is disclosed in U.S. Pat. No. 4,257,706, issued to Smith.

It is therefore a principal object of the present invention to provide a device to be mounted on a vehicle that will function as a distance gauge for use in alerting a driver backing up a vehicle of the distance between the rear of the vehicle and an object behind the vehicle.

It is a further important object of the present invention to provide a device that will provide a truck driver with ample advance warning of the decreasing distance between the rear of the truck and an object, such as a loading dock, so that the truck may be slowly and controllably backed into contact with the dock for loading and/or unloading freight or cargo.

It is an additional important object of the present invention to provide a vehicle mounted device providing a distance gauging function that is readily adaptable for effective use with vehicles of different sizes and constructions.

It is a further important object of the present invention to provide a rear distance gauging device that is viewable by the driver either in a side view mirror, or when the driver extends his or her head out the window and looks to the rear of the vehicle.

It is another important object of the present invention to provide an actuating bar extending across the width of the back of the vehicle, and linkage to the distance indicator device.

SUMMARY OF THE INVENTION

The above and other objects of the present invention are achieved in the present invention by providing a vehicle mounted distance gauge that is highly effective in indicating to a driver that his vehicle is closely approaching an object at the rear of the vehicle. The device is positioned at the side of the vehicle such that it can be viewed in the side view mirror, or directly by the driver if the driver is looking rearward from the window.

The distance gauge device employs a plunger that is normally carried by the vehicle, hereafter referred to generally as a truck, in a retracted position, and is then moved to an extended operating position when the vehicle is in the general proximity of the space or area which it is to be backed into. For purposes of simplicity, this space or area will hereafter be referred to as a loading dock, dock, or bay, even though it will be well understood that the device can be used with vehicles other than trucks, and may be used as a distance gauge for backing into close proximity to objects other than loading docks. The plunger extends rearwardly from the rear-most point of the vehicle to a distance of about 10–12 inches. As the vehicle is backed into the dock, when the vehicle closely approaches the dock, the plunger contacts the wall of the dock underneath the doorway of the bay.

The plunger is biased outwardly, but will be pushed in as the truck moves closer to the dock. The plunger is coupled to a pivotable sign which serves as the distance indicating means. The sign is secured to the truck in a position that will be in the view of the driver, through his driver's-side side view mirror and/or if the driver's practice is to lean out the window looking rearwardly when backing up to a dock. The sign is carried in a housing, and is not visible when the plunger is fully extended or fully retracted. The sign pivots out of the housing and rotates forward toward the driver. The sign has a top flange painted with a highly visible or high contrast coating on its outer surface, and, when the sign begins to return into the housing, the amount of that flange visible to the driver begins to decrease, and eventually disappears.

The coupling of the plunger to the sign is effected by an extension portion of the plunger interacting with an actuating arm on a first bevel gear, which interaction rotates the first bevel gear. A second bevel gear is meshed with the first pivot gear, and carries a shaft extending upwardly into the sign housing. The sign is secured to the shaft such that the turning of the bevel gears causes the sign to pivot. The gearing ratio is selected such that the sign will pivot through a 180° sweep as the plunger retracts the approximately 10–12 inches that it originally extended from the rear of the truck. The sign thus moves at a rate that will give the driver a highly effective way of gauging distance as his truck approaches in close proximity to a dock.

In an alternative embodiment, an activator bar is employed as the element that will make contact with the loading dock or other object at the rear of a vehicle traveling in reverse. The activator bar is coupled to the plunger or the extension portion of the plunger, and is secured so as to be pivotable or retractable upon movement of the vehicle closer to the dock or other object, and is coupled or linked to the plunger to move the sign as the vehicle moves closer to the dock.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figure 1:
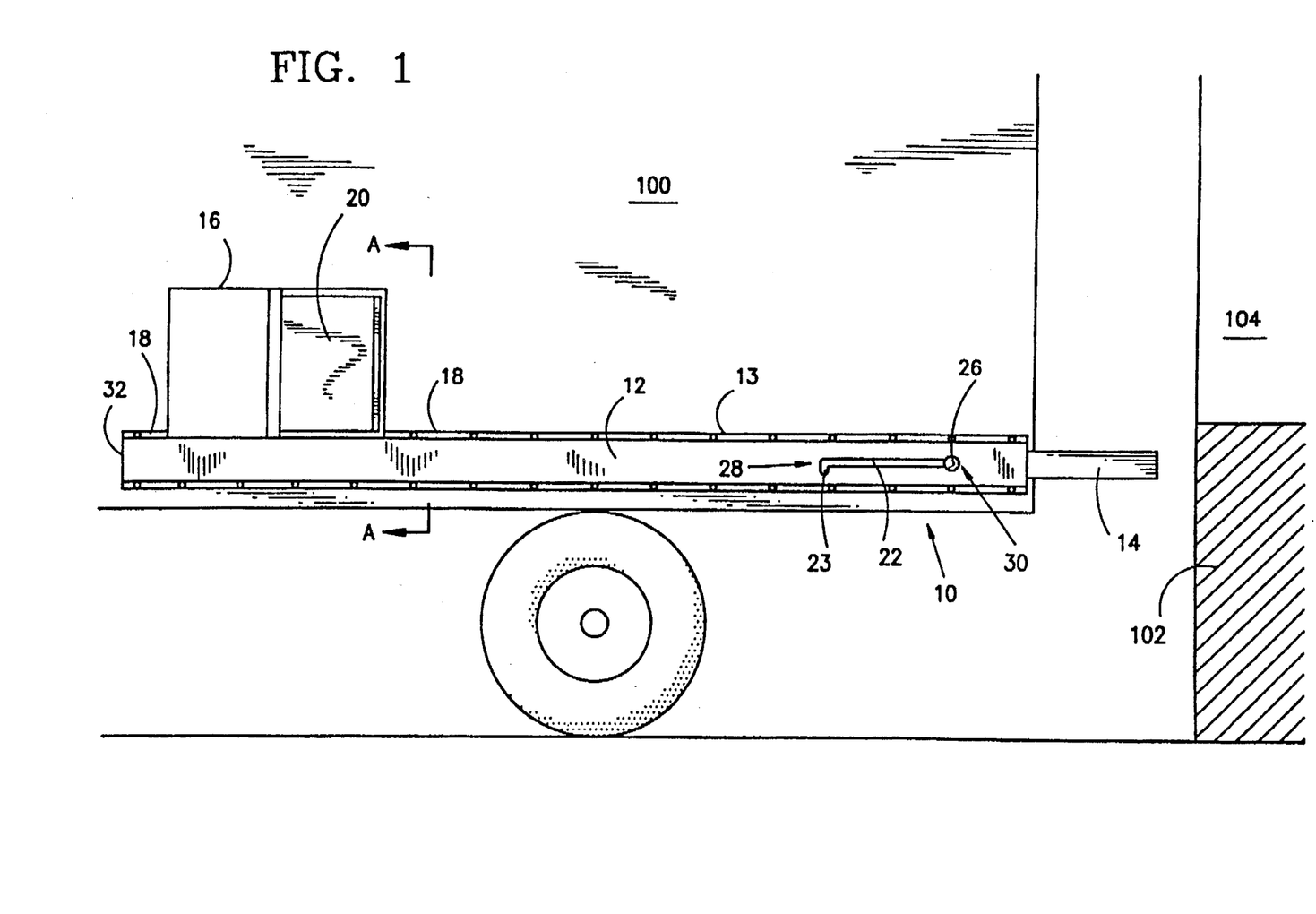
FIG. 1 is a side elevation view of a truck having a backing distance gauge according to a preferred embodiment of the present invention secured thereto.

Referring initially to FIG. 1, in accordance with a preferred embodiment of the present invention, a backing distance gauge assembly 10 is installed on a trailer 100 (hereafter "truck", generically) to be hitched to a tractor in a tractor-trailer combination for road transportation. The outer casing 12 of the assembly is secured to the side of the truck, as by a plurality of nut and bolt pairs, represented schematically at 13, which bolt through the skin of the truck to secure the casing to the I-beam frame behind the skin, in a manner that will be readily apparent to those of ordinary skill in the art.

The casing extends substantially horizontally along the driver's side of the truck at a height slightly above the lowest extent of the truck frame, and at a level that is sufficiently low such that a plunger 14 extending outwardly therefrom will be in a position to contact a wall 102 extending underneath an open bay 104 at a loading dock. The casing 12 preferably extends from a point spaced very close to the rearmost extent of the truck, for a length of several feet, for example, five or six feet, toward the front of the truck.

A sign housing 16 is mounted to the upper surface 18 of the casing 12 near the forward extent of the casing. The sign housing carries a sign 20 therein that is used to aid a driver, as will be discussed later, in gauging or judging the distance between the back of his truck 100 and the wall 102 of the dock. The sign housing 16 and sign 20 are thus positioned alongside the truck in a position that enables them to readily be seen by the driver from his rearview mirror, or by a driver leaning out his window and looking to the rear of the truck.

FIG. 1 also illustrates that the casing 12 has a slot 22 extending along part of its length. The length of the slot 22, generally on the order of ten to twelve inches, defines the length of travel of plunger 14, in that the extension 24 of the plunger extending internally in the casing 12 (see FIG. 2), has a fixed pin 26 secured to the extension that protrudes laterally outwardly therefrom, and is permitted to travel in the slot 22. The forward 28 and rear 30 extents of the slot will restrain pin 26 from further movement in those respective directions, thus also limiting the extent of travel of the internal plunger extension 24 and the plunger 14 itself.

Slot 22 has a catch 23 at the forward extent 28 of the slot, so that pin 26 can drop into the catch when the plunger is fully retracted, thus maintaining the plunger, which is biased toward its extended position, in its retracted state after the truck 100 has pulled away from the dock, and begins travel along the roadways. While it is not believed to be mandatory to provide a catch or other means for maintaining the plunger 14 in this retracted state, it is seen as being desirable to reduce the possibility of mishaps as the truck travels on the roadways. Further, although the provision of a catch will require the driver to exit the truck 100 to activate the plunger, i.e., to free the plunger 14 from the catch so that the plunger will move to its extended position, this is not likely to be viewed as a significant drawback in the case of a truck or tractor-trailer backing up to a loading dock. In such instances, prior to the driver making his close approach to the dock, he must exit the truck to open the doors at the rear of the truck or trailer, and thus must pass by the assembly 10 twice, allowing him to release the pin 26 from the catch 23.

Figure 2:
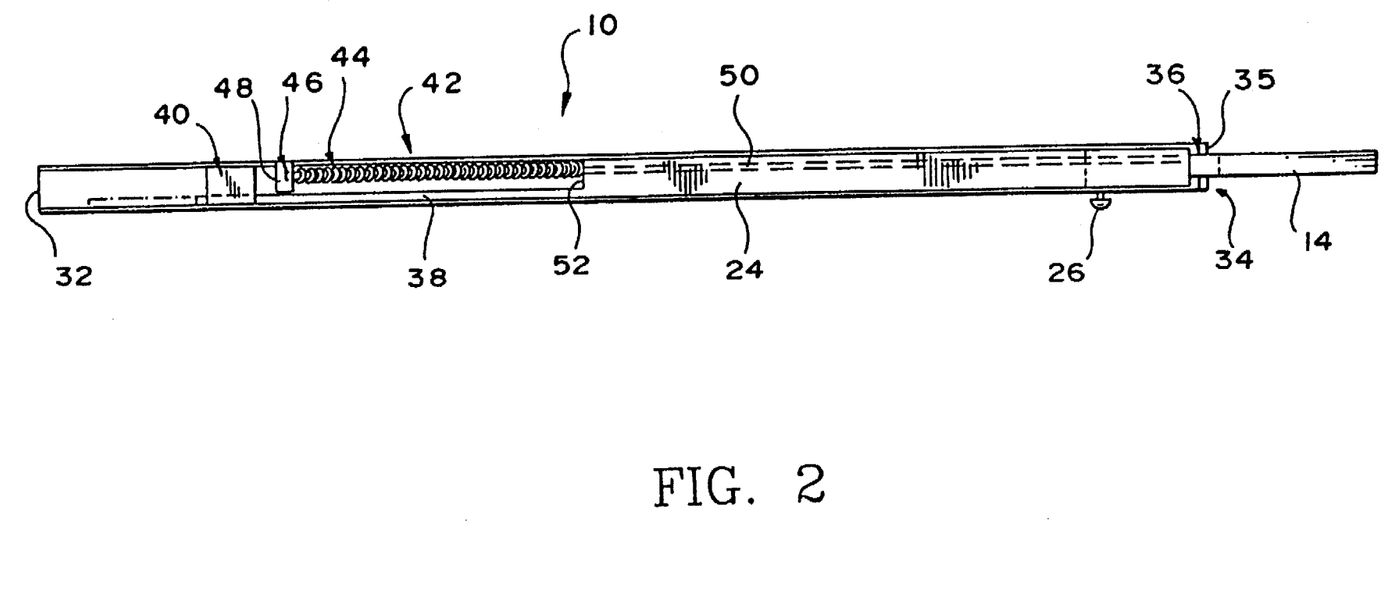
FIG. 2 is a top cutaway view of the backing distance gauge of the present invention.

Turning now to FIG. 2, a top cutaway view of the assembly 10 is illustrated. The outer casing 12 houses the plunger extension member 24 that is preferably made from one or more pieces of steel or aluminum plate stock. Casing 12 is also preferably made from plate stock, or may be made of a large thin walled hollow channel stock. Casing 12 has a cap 32 at a forward extent thereof, and also a cap 35 at its rear end 34, with rear cap 35 having an opening therein to permit the plunger 14 to move therethrough between its limits of travel. In order to keep the interior of the casing isolated from the outside environment, a rubber insert 36, such as a seal or boot, is secured to the rear cap 35, and the seal extends inwardly to surround plunger 14, preferably in complete contact with the external surface of the plunger.

The plunger extension member 24, which will also be referred to as the plunger beam 24, extends forward from the plunger 14 to a distance approximately twelve to eighteen inches short of the forward casing end cap 32. As seen in FIG. 2, the beam, which can be made of steel, aluminum, or other suitable rigid material, has a reduced width section 38 at its forward end. The reduced width section 38, when the plunger 16 is extended, terminates in the casing at a point substantially adjacent gearbox 40 (see also FIGS. 3 and 4).

Extending alongside reduced width section 38 is a biasing means 42, which, in the preferred embodiment, comprises a compression spring 44 surrounding a steel rod 46. The steel rod is further fixedly secured, using any suitable conventional fasteners or by welding (not shown), to stop block 48, with stop block 48 itself being mounted to the inner wall of casing 12. The steel rod extends from the stop block rearwardly into a bore 50 in plunger beam 24 for a distance of approximately one or two inches when the plunger 14 and plunger beam 24 are at the extended position. At the location where the beam 24 transitions to the reduced width section 38, the beam presents a spring-engaging surface 52 through which bore 50 extends, the surface 52 retaining the spring at the forward end of rod 46.

The spring is selected to be of a length such that a rearward biasing force is continuously maintained on the spring-engaging surface 52 of the beam 24, thereby maintaining the beam at its rearmost position and maintaining plunger 14 at its extended position, unless pin 26 is engaged in the catch 23, as discussed previously, at which point the biasing force is overcome by the retaining force of the pin and catch. In operation, as the plunger 14 and beam 24 are pushed inwardly as a result of the plunger engaging an object which the truck is backing toward, the spring will compress to allow the beam to move inwardly. The reduced width section 38 of the beam 24 moves past the stop block 48 and the spring assembly. The rear part of the beam is able to move forward as the steel rod 46 passes through bore 50. The plunger 14 is able to retract into the casing, as there will be sufficient offset or clearance from the steel rod such that there will be no interference with inward movement of the plunger.

Figure 3:
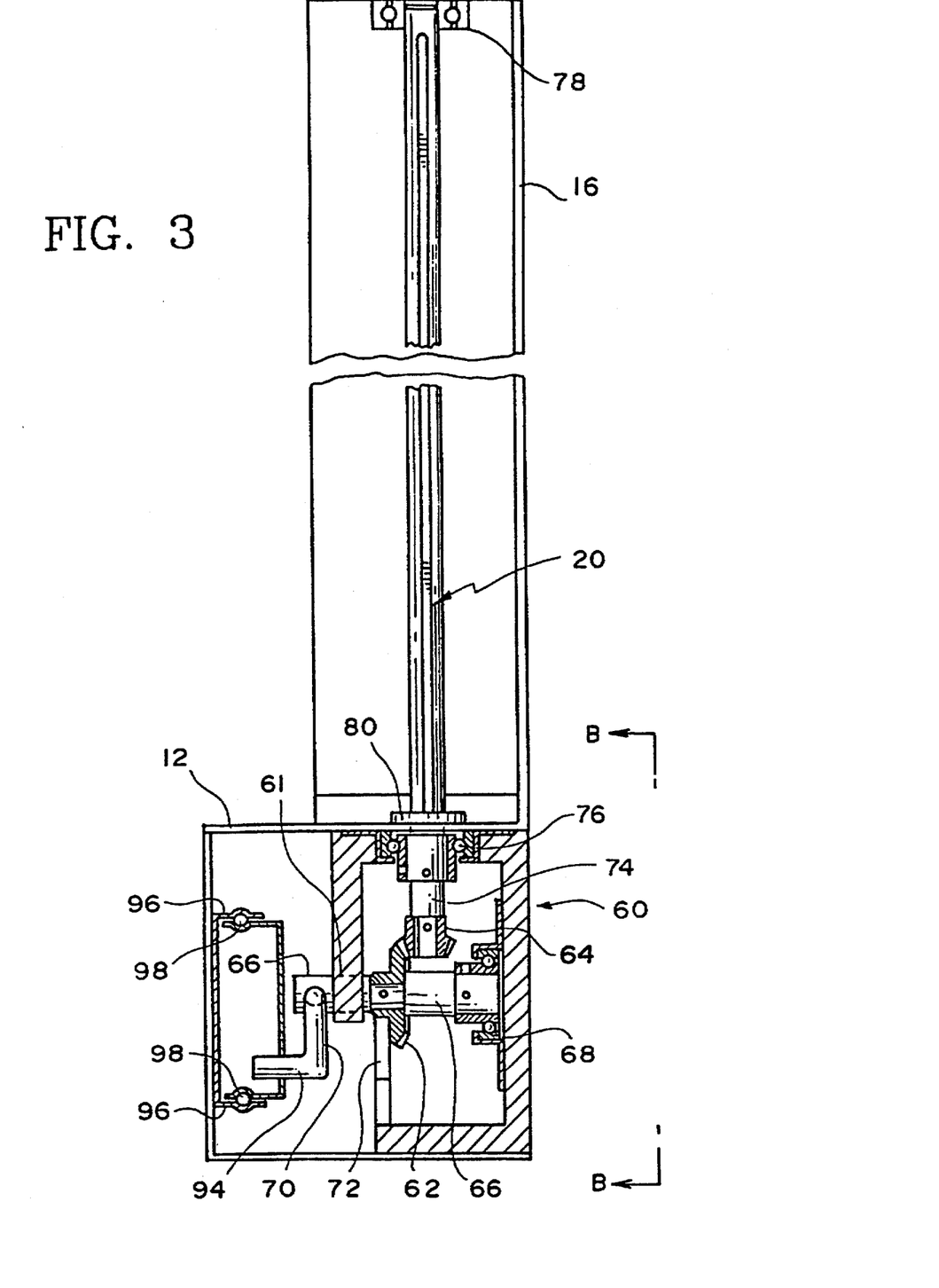
FIG. 3 is a sectional view of the gearbox and sign, as viewed in direction A—A in FIG. 1.
Figure 4:
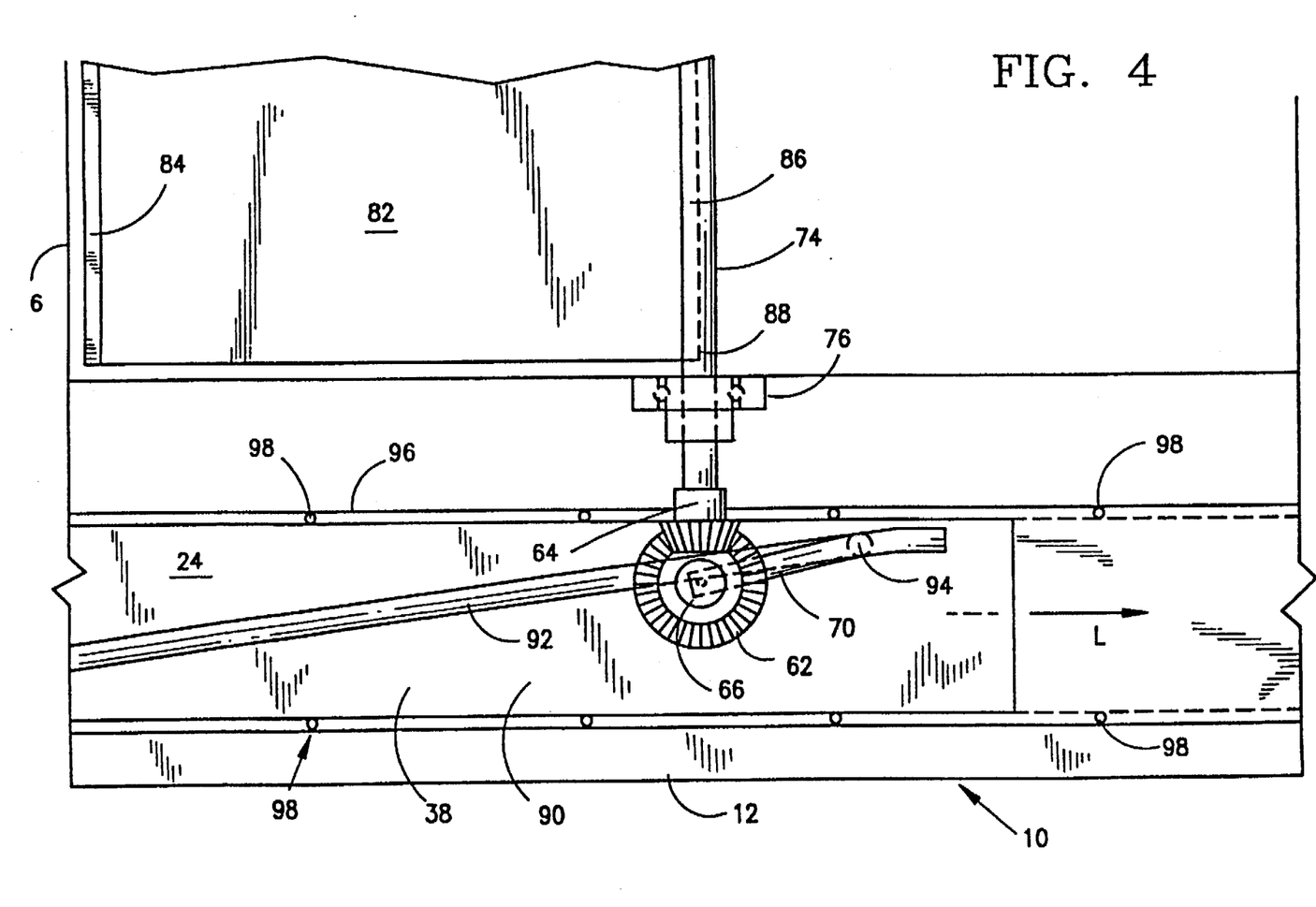
FIG. 4 is a side cutaway, partially schematic view of the gearing, sign, and internal extension of the plunger as viewed from direction B—B in FIG. 3.

Shown schematically in FIG. 2 is gearbox 60, which is located approximately twelve to eighteen inches from the forward end cap 32 of the casing. FIGS. 3 and 4 illustrate the gearbox 60 and its components in more detail, and also illustrate the gearing system used to rotate or pivot sign 20. In FIG. 3, it can be seen that gearbox 60 is housed within casing 12 and is constructed of steel or aluminum plate (or other material of suitable strength), and occupies roughly half of the width of the casing. Gearbox 60 preferably contains a pair of meshing bevel gears, a driving gear 62 and a driven gear 64, disposed at a right-angle orientation to each other.

Driving gear 62 is fixedly mounted, as by press fit or set screw(s), onto driving shaft 66. An inner end of driving shaft is carried in bearing assembly 68, or, alternatively a simple block having a cylindrical opening, if it is determined that a bearing mounting is not required. An outer end of shaft 66 extends through bore 61 in gearbox 60, and has a follower arm 70 extending radially therefrom, the purpose of which will be described in greater detail later. If desired, a gear retainer 72 mounted to the floor of gearbox 60 may be employed to ensure that driving gear 62 will not move or deflect outwardly under load such that the gears become unmeshed. The gear retainer can simply be a plate that presents an obstacle at the back face of the gear, preventing the gear from moving outwardly (to the left in FIG. 3).

The driven gear 64 is secured to driven shaft 74, which extends vertically upwardly through a bearing block 76 disposed at the upper wall of gearbox 60 and through an opening in the upper surface of casing 12. Driven shaft 74 extends upwardly through the entire height of sign housing 16, and an upper end of the shaft is preferably retained in an upper shaft bearing 78. Alternatively, the upper end of driven shaft 74 may be retained in a simple cylindrical cup, or it is possible that the shaft could be unrestrained provided it is of sufficient rigidity to remain in a vertical orientation.

Driven shaft 74 can be retained in its proper vertical position by various means, including by press fitting the shaft to an inner bearing member that is itself retained in position in bearing block 76 in a known manner. Alternatively, a radially extending stop flange 80 may be fixed on shaft 74, the stop flange being of a size that interference with the casing surrounding the opening in the casing will prevent the shaft from moving vertically downwardly. It is to be noted that the gear positioning and the inability of the driven shaft to deflect out of position itself may be adequate in some instances to prevent the shaft from moving vertically downwardly, but, in general, it is preferable to not place such load on the gear pair, as it may decrease the efficiency of the gear pair or cause binding of the gears to occur.

Sign 20 (see also FIGS. 5A–C) is of approximately a T-shape in cross-section, when viewed from above, and is made of a flat plate 82, with an outer flange 84 affixed at an outer edge of the plate 82, at substantially a right angle to the plate. The inner edge 86 of the plate 82 is preferably inserted into a vertically extending slot 88 in driven shaft 74, and may be secured thereto by tack weld, spot weld, full weld, or by conventional fastening devices. Sign housing 16 is preferably on the order of thirteen inches high, and the height of the sign itself will preferably be between twelve and thirteen inches high. With sign 20 secured to driven shaft 74, when driven shaft is rotated, in a manner that will be described below, the sign will also pivot or rotate with the driven shaft.

FIGS. 3 and 4 in combination show how the driven shaft 74 and sign 20 are rotated when the plunger 14 extending from the rear of casing 12 is pushed forward into the casing as the truck approaches the loading dock. FIG. 4 illustrates the plunger beam 24 and the driving and driven gears 62, 64, omitting the details of the mounting of the gears. The terminal end 90 of the reduced width beam section 38 is provided with a slot 92 cut therethrough that descends at a predetermined angle relative to a longitudinal axis L of the beam, which is preferably in a horizontal orientation, in a direction running from the end 90 of the beam rearwardly toward plunger 14.

Follower arm 70 extends radially outwardly from driving shaft 66, and has a transversely extending (relative to follower arm 70, see FIG. 3) tab 94, which extends along an axis parallel to the longitudinal axis of shaft 66. Tab 94 is of a length sufficient to extend into slot 92 of plunger beam 24, and is of a cross-sectional dimension slightly smaller than the width of the slot. Shown substantially schematically in both of FIGS. 3 and 4, a rail guide 96, containing a plurality of bearings 98, is provided to smoothly guide at least the terminal end 90 of plunger beam 24 as it moves in concert with the retraction and extension of plunger 14. The rail guide is mounted to the interior surface of the outer wall of casing 12, and in addition to providing a low friction guide, it provides the structural support that will ensure that the plunger beam will remain at its proper elevation inside the casing.

Figure 5A:
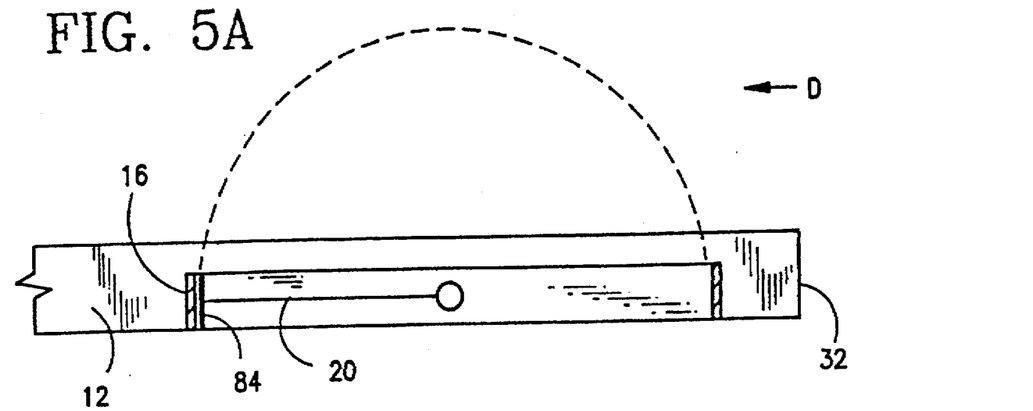
FIGS. 5A–C are top plan views, in substantially schematic form, of the sign housing and sign of the present invention.
Figure 5B:
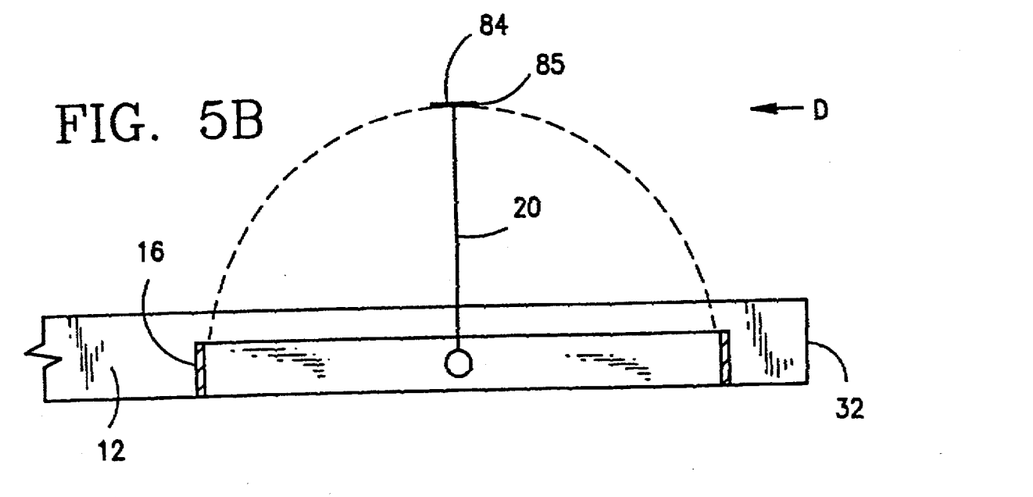
Figure 5C:
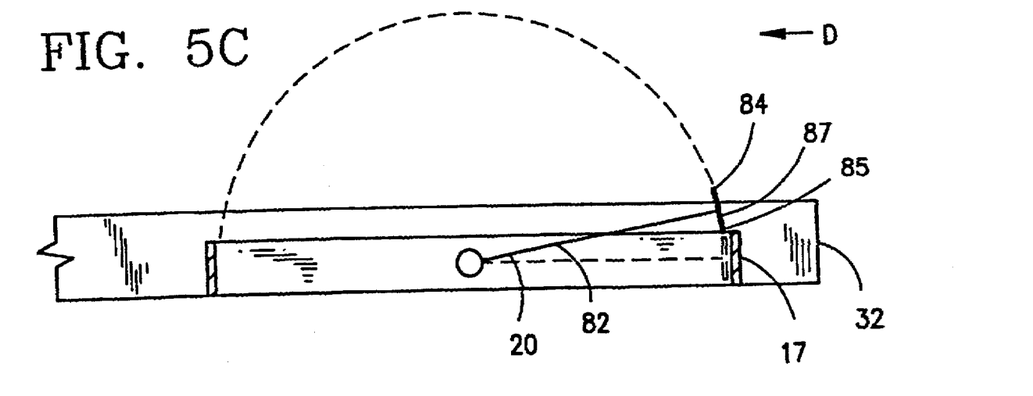

It will be seen with reference to FIG. 4 that, as the plunger beam 24 is moved forward toward the front of the truck (to the right in FIG. 4), as a result of plunger 14 being pushed forward and inwardly into the casing 12, the upper surface of slot 92 will force tab 94, and follower arm 70 to rotate in a downward (or clockwise, as shown) direction. This rotation causes driving shaft 66 and driving gear 62 to also move in a clockwise direction. The rotation of driving gear 62 in turn rotates driven gear 64 in a clockwise direction, as viewed from above, as in FIGS. 5A–C. Driven shaft 74, which is coupled to, and is preferably affixed to, driven gear 64, thus rotates in a clockwise direction, sweeping sign 20 through an arc as seen in FIGS. 5A–C. With the assembly 10 being mounted on the driver's side of the truck, this clockwise rotation causes the sign 20 to rotate or pivot in a direction toward the front of the truck.

The angle of descent of the slot 92 and the size, including relative size, of the gears, are selected, in a manner that will be readily apparent to those of ordinary skill in the art, such that the driven shaft 74 and sign 20 mounted thereon, will rotate through 180° as the plunger 14 moves the distance from its fully extended position to its fully retracted position, generally preferably on the order of ten inches. It will be readily apparent that if a different plunger range of travel is desired, such as twelve or eighteen inches, it will generally be possible to select a slot descent angle and appropriate gear sizes such that the sign will rotate 180° as the plunger moves that distance.

As discussed previously in the specification, as plunger and plunger beam move forward as the plunger is retracted, pin 26 advances in a forward direction in slot 22. Upon reaching the forward extent 28 of the slot, the pin will drop into catch 23, thereby locking the plunger in its fully retracted position. In this position, the sign 20 has completed a full 180° rotation toward the front of the truck, and the sign will remain in that forward position when the truck 100 takes to the roads. Upon driver activation of the plunger at a loading dock site, as also previously discussed, as the pin is freed from the catch and as the plunger is moved to its extended position by the biasing force of compression spring 44.

A highly effective distance gauging function is provided by the present assembly. In particular an assembly that employs rotating a sign that is initially not visible to the driver, being housed within sign housing 16, and is then visible and increases in apparent size as the sign approaches a perpendicular orientation to the truck, then decreases in apparent size, and finally presents a highly visible indicator that the truck has reached the point of closest approach, namely, the disappearance of the sign into the front portion of the sign housing, is very effective in signaling to the driver, beginning at a point at which the truck is ten inches away from the loading dock, how much distance remains between the truck and the wall. The indication is generally qualitative and not quantitative in nature, meaning that the indication is not given in terms of number of inches, which is believed will be readily embraced by truck drivers, who are accustomed to judging clearances and distances by qualitative techniques.

FIGS. 5A–C illustrate the position of sign 20 at its two extreme positions, and at the midpoint (90°) of its rotation. Arrow D indicates the direction from which the driver will be viewing the indicator. It can be seen that the sign housing 16 is of a depth substantially equal to the width of outer flange 84 of sign 20, and, as such, no portion of the sign will be visible to the driver when the plunger 14 is fully extended, as seen in FIG. 5A.

The arc swept by the sign is represented in broken lines in these figures. It will be recognized that, in moving from the sign position in FIG. 5A to the position shown in FIG. 5B, the apparent size of the sign, as viewed by the driver, will increase until the sign is fully perpendicular to the side of the truck. As the sign rotates past this point, the apparent size of the sign begins to decrease, giving the driver an indication that the truck is within five inches (one half of the initial ten inch plunger extension) of the loading dock.

Figure 6A:
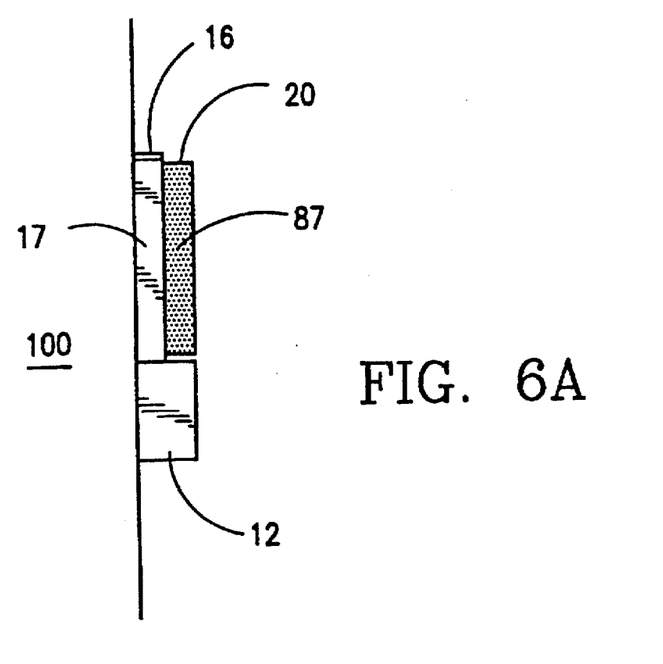
FIGS. 6A–B are elevation views of the sign and sign housing, as viewed from the driver's vantage point.
Figure 6B:
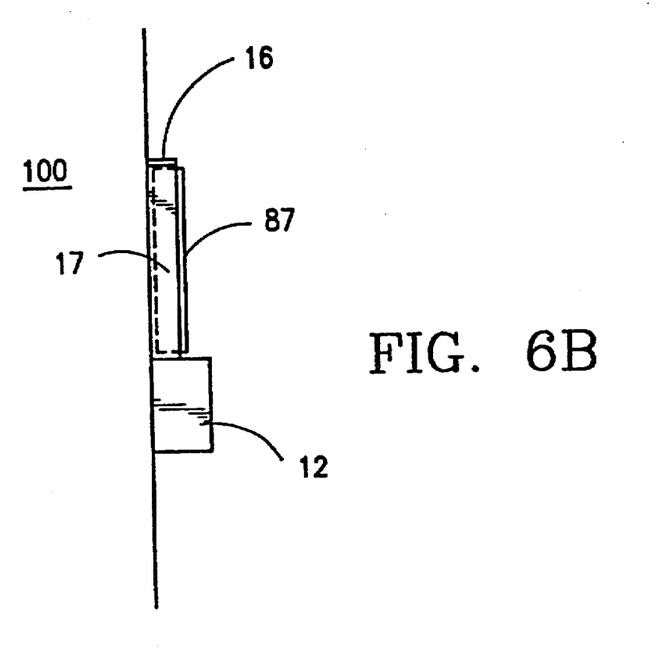

Turning to FIG. 5C, as the truck moves even closer to the loading dock, the size of the sign decreases, and the flat plate 82 portion of the sign eventually is hidden from sight by the wall 17 of the sign housing and the outer flange 84, as the leading edge 85 of the flange begins to enter the housing 16. The outer surface 87 of the flange now visible to the driver is preferably painted or coated with a high visibility coating, such as a bright or fluorescent color or a color that creates a high degree of contrast with the color of the wall 17 of the sign housing that is visible to the driver. As can be seen in FIGS. 6A and 6B, where surface 87 is shown in solid marking to represent the bright or high contrast color, the driver will be able to gauge the approximately last inch of approach by viewing the outer edge of the flange as it disappears behind the wall 17 of the sign housing 16. Again, this sighting system is believed to provide a highly effective way for the driver to controllably back a truck into contact or into very close proximity with a loading dock or other object. The system eliminates having to rely on mirrors mounted to the loading dock showing the back end of the truck, or on potentially inaccurate or misleading signals given by loading dock personnel, and eliminates, where those aids are not available, the need to stop several times to get out and see how much closer the truck needs to be, and prevents damage to the truck or to the object resulting from not using any aids or from using inaccurate aids.

The sighting system and the gearing that moves the sign can further be used in several alternative embodiments of the present invention, as can be seen in FIGS. 7–10. The alternative embodiments discussed and illustrated herein take advantage of the use of an activator bar 200 which has a generally horizontal contact bar extending across substantially the entire width at the rear of truck 100.

The horizontal contact bar 100 is preferably maintained in position by a pair of side arms 202, which extend downwardly from the truck and position the contact bar at a height lower than the truck frame, and preferably at or below the height of the horizonal element 106 of which is known in the art as the ICC (Interstate Commerce Commission) bar 108.

Figure 7:
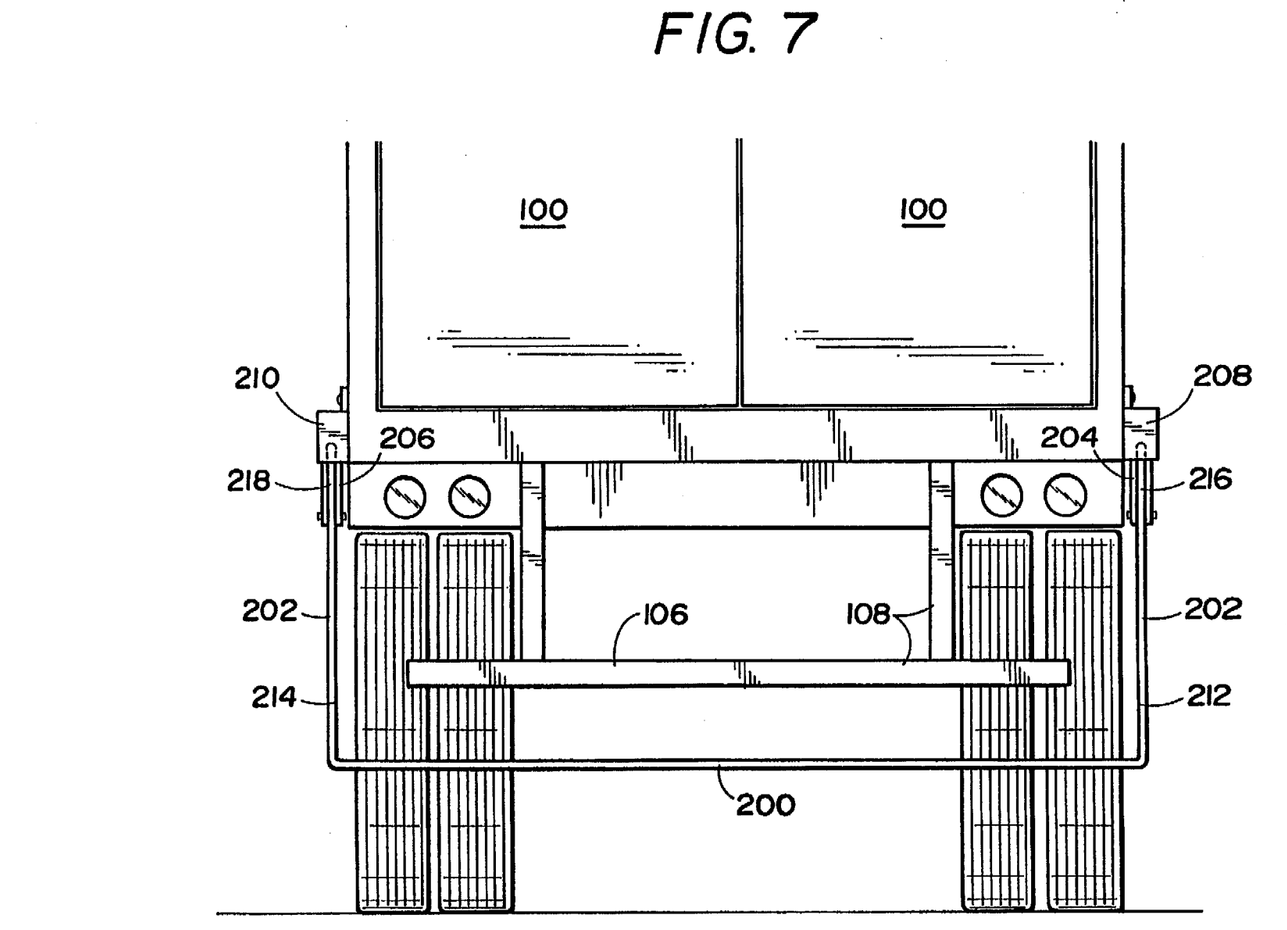
FIG. 7 is a rear elevation view of a truck having a backing distance gauge, according to an alternate preferred embodiment of the present invention, secured thereto.
Figure 8:
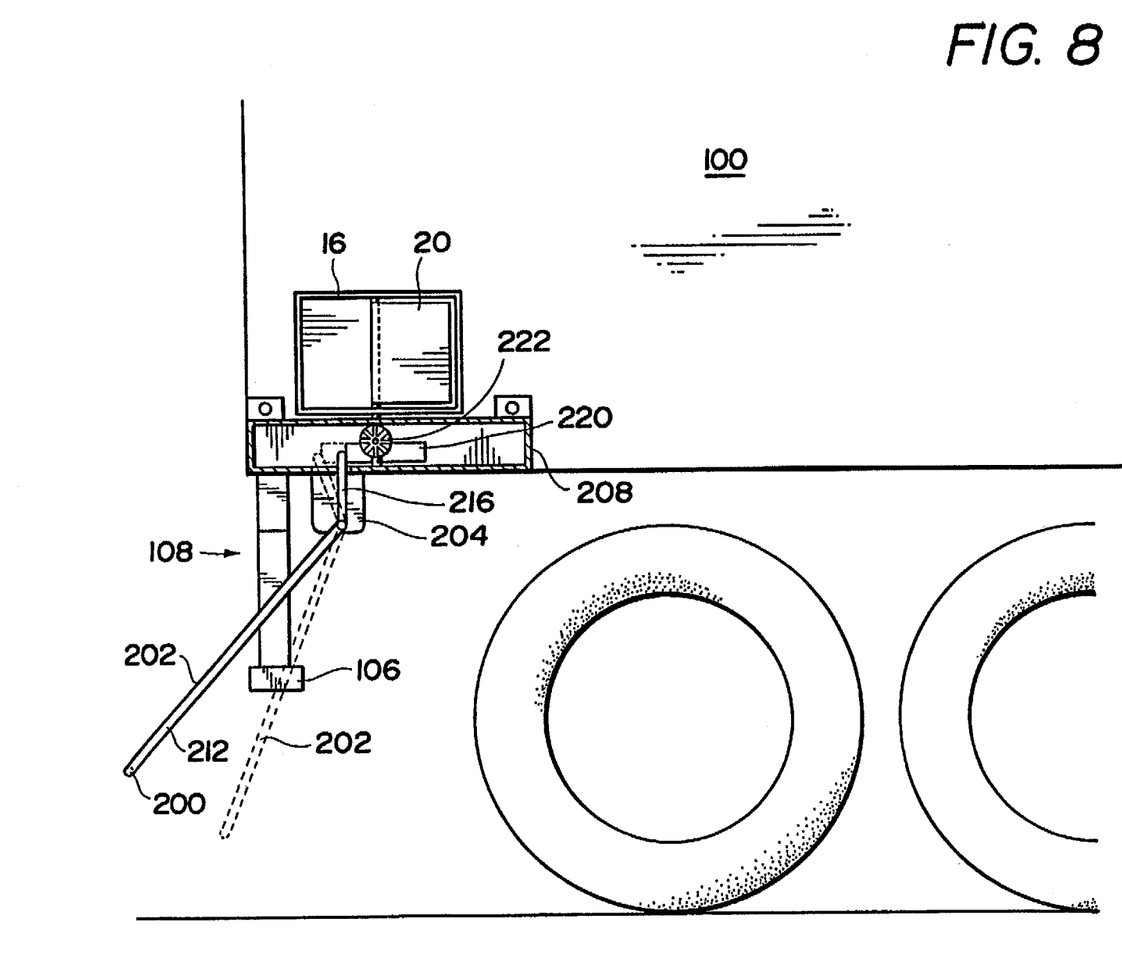
FIG. 8 is a side, partially schematic, view of a truck having a backing distance gauge of FIG. 8 secured thereto.

Referring specifically to FIGS. 7 and 8, a first embodiment employing the activator bar assembly 200 is shown. In this embodiment, right and left brackets 204, 206 are secured to, and depend downwardly from, right and left casings 208, 210, which are shortened versions of casing 12 (FIG. 1), disposed on either side of the truck at the height of the truck frame. The sidearms 202 in this embodiment are bar elements 212, 214, formed integrally with contact bar 200. At their upper ends 216, 218, bar elements 212, 214 are preferably bent or angled, and are pivotably secured to the right and left brackets, respectively, at the points where the bends are located.

The upper ends 216, 218 of the bar elements extend upwardly from their points of pivotable securement, into a slot (not shown) in the respective right and left casings 208, 210, as can be seen in the schematic representation of FIG. 8. In this particular embodiment, the sign and its housing, as well as the gearing are essentially identical to those illustrated and described with respect to FIGS. 1–6.

It will be readily apparent to those of ordinary skill in the art that there is no externally protruding plunger 14, as in the FIG. 1 embodiment, but a modified inner plunger extension member 220 is operatively coupled between the gearing 222 for pivoting the sign and the upper ends 216, 218 of the bar elements. The gearing is to be so constructed and arranged to pivot the sign 20 from its rear to its forward position (the same manner of movement in the embodiment of FIGS. 1–6), upon the plunger extension member 220 being pulled toward the rear of the truck 100 (the opposite direction of plunger movement in the FIG. 1–6 embodiment) by the pulling of upper ends 216, 218 of the bar elements.

The casings are substantially of the same construction as the casings previously described and illustrated with respect to FIGS. 1–6, but, as illustrated, can be shortened by moving the sign housing further toward the rear of the truck, if the sight lines of the truck permit. Further, while it is envisioned that the casings and signs will be positioned on both sides of a truck 100, it would be possible to provide this configuration with a sign and housing on only one side of the truck, with the other side having only the securement bracket 204 or 206 at the opposite side for supporting the side arm and activator bar.

The activator bar construction is seen as being advantageous for use on trucks which will encounter varying loading dock configurations, with the bar ensuring that contact is made with the object protruding farthest from the loading dock across the width of the truck. This is especially important where various dock bumpers are used that may not extend all of the way out to the sides of the trucks backing into the dock. In such a situation, the plunger of FIGS. 1–6 might not contact the protruding bumper, and thus not provide an accurate gauge of the distance from the farthest protruding object.

It can be seen in FIG. 8 that the side arms and activator bar will be biased to an extended position, and then, upon the activator bar making contact with a dock, a dock bumper or other protruding object, the arms will pivot to "retract" the bar as the truck backs toward the dock. As the arms pivot to their retracted position (broken lines) the upper ends move toward the rear of the truck and, being operatively coupled to the gearing, the upper ends will pivot the signs as is described in more detail with respect to FIGS. 1–6, and thus allow the truck driver to use the signs and their housings to gauge the distance of his truck to the dock toward which he is backing the truck.

Figure 9:
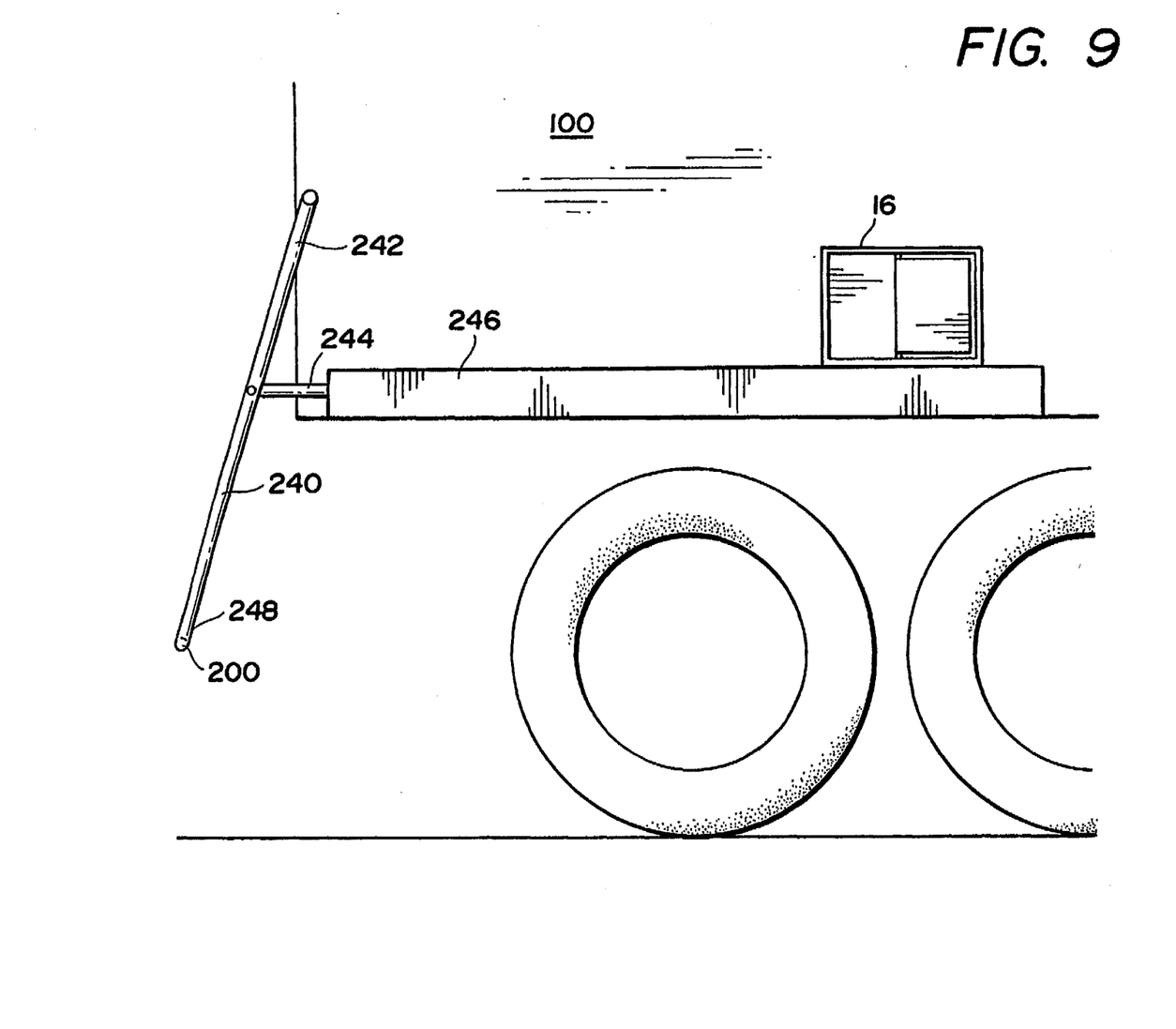
FIG. 9 is a side, partially schematic, view of another alternative preferred embodiment of the backing distance gauge of the present invention.
Figure 10:
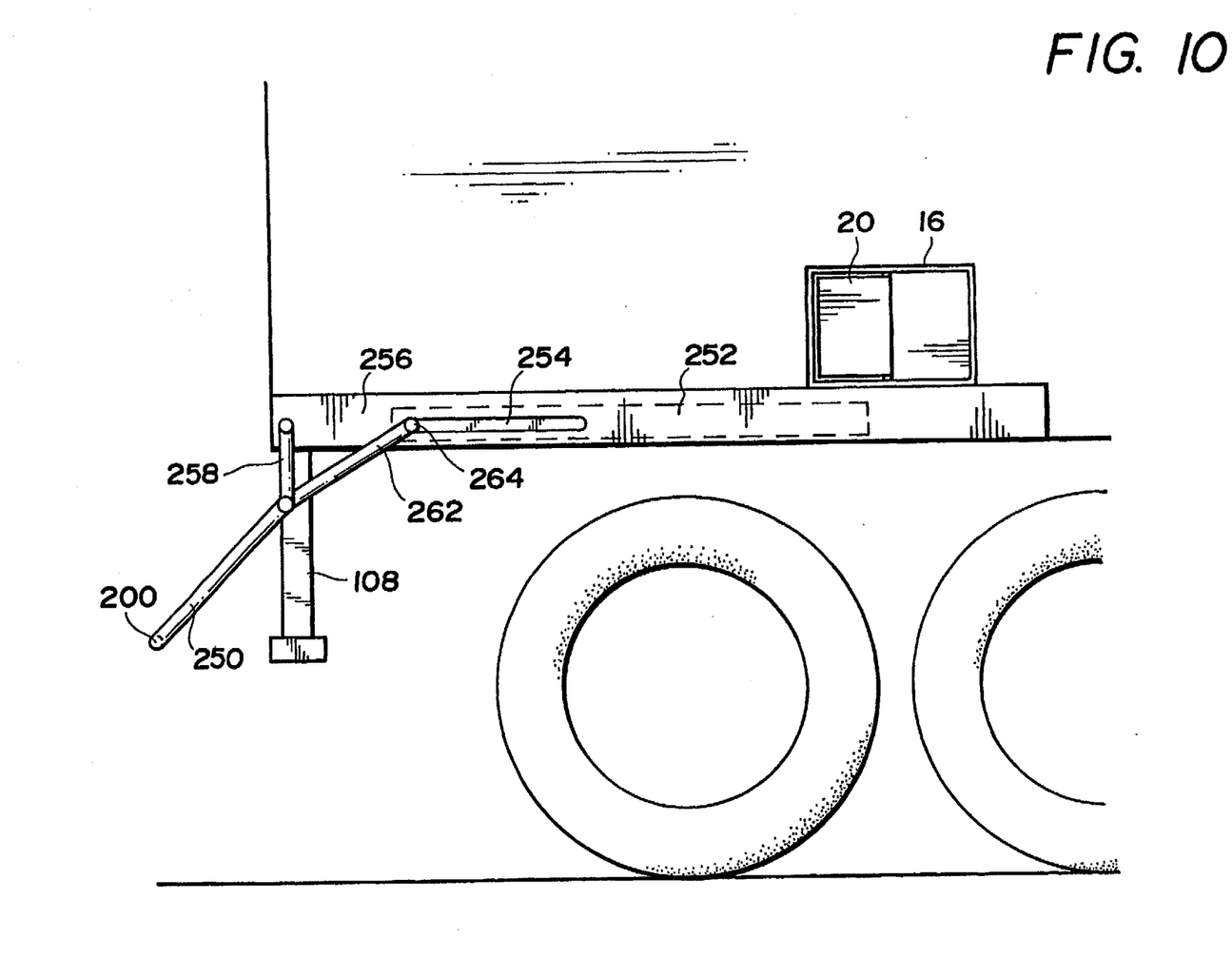
FIG. 10 is a side, partially schematic, view of another alternative preferred embodiment of the backing distance gauge of the present invention.

FIGS. 9 and 10 illustrate, in substantially schematic form, two further variations on the embodiment of the invention in which an activator bar 200 is used. The principal difference in these variants from the embodiment shown in FIGS. 7 and 8 is that the linkage or coupling of the activator bar to the sign pivoting mechanism is different. In these embodiments, the side arms are employed to push a plunger extension within the casing, much in the same manner as is done in the embodiment of FIGS. 1–6.

Looking first at FIG. 9, a pair (one shown) of long side arms 240 is provided, with activator bar 200 extending therebetween, and with the bar 200 being retained in a substantially horizontal orientation. The upper ends 242 of the side arms are pivotably secured to the truck body 100, at a position above the plunger 244 and casing 246. At a point in between the upper ends 242 and the lower ends 248 of the side arms, the side arms are secured to plungers 244 (one shown). This securement is preferably a pinned, pivotable connection, so as to allow the plunger 244 to travel in a substantially horizontal plane, but it may be possible to configure the unit such that the connection of the side arms to the plungers is substantially rigid, as by welding.

The activator bar 200 operates in substantially the same manner as in the FIG. 7 and 8 embodiment, in that it will contact the object protruding farthest from the loading dock, for example, a dock bumper. Upon further backing of the truck, the contact between the activator bar and the dock causes side arms 240 to pivot about their upper ends 242, with the activator bar "retracting" to a position nearer the rearmost extent of the truck. When this occurs, plunger 244 acts in substantially the same manner as does plunger 14 in the FIG. 1–6 embodiment, in causing the sign that it is coupled to, to pivot toward the front of the truck, for assisting the truck driver in gauging his approach distance to the dock.

The embodiment in FIG. 10 differs somewhat, in that the side arms 250 (one shown) are coupled to an internal plunger extension member 252 via a slot 254 in casing 256. This embodiment was designed specifically for truck drivers wishing to outfit their trucks with a distance gauge having the activator bar feature of the present invention, but also desiring to not have the activator bar extend to a height lower than the ICC bar.

In this embodiment, side arms 250 are slightly bent at a point along their length, and have a guide link 258 pivotably secured thereto at the point of the bend, with an opposite end of the guide link 258 being pivotably secured to the casing 256 or, alternatively, to a lower portion of the truck body. The guide links 258 retain the side arms and activator bar 200 at the desired vertical height above the ground, when the device is deployed for use. The pivotable linkage and the bend in the side arms are provided in order to prevent the device from binding or freezing up, and they greatly facilitate the retraction of the side arms inwardly in the direction of the front of the truck.

In operation, the side arms and activator bar are initially deployed as illustrated in FIG. 10. Upon the activator bar coming into contact with the dock, dock bumper, or other protrusion, and upon further backing of the truck, the bar 200 and side arms 250 move or retract toward the front of the truck, with guide link 258 pivoting counterclockwise (as shown), its lower end traveling forward with side arm 250.

The upper end 262 of side arm 250 is pivotably secured, as by a pin 264 extending through slot 254 in casing 256 to internal plunger extension member 252, which is of substantially the same construction as the plunger extension member in the FIG. 1–6 embodiment, but sized appropriately for use in this FIG. 10 embodiment. Thus, as side arms move forward toward the front of the truck, the side arms move the plunger extension member 252 forward to actuate and pivot the distance gauging sign 20. Once fully retracted, the side arms 250 and guide links 258 may be secured in the retracted position by any suitable means that will be readily apparent to persons of ordinary skill in the art.

It is to be understood that the foregoing description of the preferred embodiments of the present invention is for illustrative purposes, and many variations will become apparent to those of ordinary skill in the art upon reading this disclosure and viewing the figures forming a part of this disclosure. Such variations do not depart from the spirit and scope of the present invention, and the scope of the invention is to be determined by reference to the appended claims.

What is claimed is:

1. A distance gauge adapted to be mounted on a vehicle at a position viewable by a driver of said vehicle, comprising:

an activator bar sized to extend across a width of said vehicle and adapted to travel between an extended position and a retracted position, said activator bar being held in position by a first and a second side arm at a lower end of said first and said second side arms;

a biasing element so constructed and arranged to apply a biasing force on said first and second side arms to bias said first and second side arms and said activator bar toward said extended position; and an indicator sign operatively coupled to at least said first side arm such that said indicator sign moves from a first position when said activator bar is at said extended position, to a second position when said activator bar is at said retracted position.

2. A distance gauge as recited in claim 1, further comprising a sign housing disposed about the periphery of said indicator sign, said housing being of sufficient size to prevent a driver of said vehicle from viewing said indicator sign when said sign is positioned at said second position.

3. A distance gauge as recited in claim 1, further comprising a plunger beam operatively coupled to said first side arm, and extending from said first side arm to a location adjacent said indicator sign, said plunger beam also being operatively coupled to said indicator sign.

4. A distance gauge as recited in claim 3, wherein said first and said second side arms are each pivotably secured at a position proximate an upper end thereof by a bracket disposed at an underside of a casing which houses said plunger beam, and wherein an upper end of said first side arm disposed above a point of said pivotable securement extends into said casing through an opening in a bottom of said casing, and is operatively coupled to said plunger beam inside said casing.

5. A distance gauge as recited in claim 3, wherein said first and second side arms are so constructed and arranged to be pivotably secured to a portion of said vehicle above a height of said plunger beam, and wherein said first side arm is connected at a predetermined point along its length to said plunger beam.

6. A distance gauge as recited in claim 3, further comprising a first guide link and a second guide link, a first end of said first guide link being pivotably secured to said first side arm at a position intermediate the ends of the first guide arm, and a first end of said second guide link being pivotably secured to said second side arm at a position intermediate the ends of said second guide arm, and a second end of said first guide link being pivotably secured to a casing housing said plunger beam.

7. A vehicle having a distance gauge secured thereto, said distance gauge further comprising:

fasteners for fastening said distance gauge to said vehicle at a position along a driver's side of said vehicle;

an activator bar carried at a lower end of a first and a second side arm, said activator bar extending across substantially an entire width of a rear of said vehicle, said activator bar being operable to travel between an extended position and a retracted position, said extended position being a position projecting rearwardly beyond a rear extent of said vehicle, and said retracted position being a position approximately at said rear extent of said vehicle;

biasing means for biasing said first and said second side arms and said activator bar in a direction toward said extended position;

an indicator sign operable to move between a first position and a second position;

a sign housing sized to extend around a periphery of said indicator sign when said indicator sign is at said first position and when said indicator sign is at said second position;

said activator bar and said indicator sign being operatively coupled such that, when said activator bar is moved in a direction from said extended position to said retracted position, said sign will move from said first position to said second position; and wherein said indicator sign and said sign housing are so constructed and arranged that, as said indicator sign approaches said second position, said indicator sign begins to enter said sign housing, and, when said indicator sign reaches said second position, said indicator sign is fully within said sign housing.

* * * * *